US012295522B2

(12) United States Patent
Roumen et al.

(10) Patent No.: US 12,295,522 B2
(45) Date of Patent: *May 13, 2025

(54) MIXING APPARATUS HAVING A SEAL

(71) Applicant: VERSUNI HOLDING B.V., Eindhoven (NL)

(72) Inventors: Britt Roumen, Eindhoven (NL); Bart-Jan Zwart, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,868

(22) Filed: Dec. 19, 2023

(65) Prior Publication Data
US 2024/0115070 A1 Apr. 11, 2024

Related U.S. Application Data

(63) Continuation of application No. 16/958,728, filed as application No. PCT/EP2018/086041 on Dec. 20, 2018, now Pat. No. 11,882,958.

(30) Foreign Application Priority Data

Dec. 28, 2017 (EP) .................................. 17210903

(51) Int. Cl.
*A47J 31/44* (2006.01)
*B01F 25/312* (2022.01)
*B01F 35/00* (2022.01)

(52) U.S. Cl.
CPC ......... *A47J 31/4403* (2013.01); *B01F 25/312* (2022.01); *B01F 35/561* (2022.01)

(58) Field of Classification Search
CPC . A47J 31/4403; A47J 31/4485; B01F 35/561; B01F 25/312
See application file for complete search history.

(56) References Cited

U.S. PATENT DOCUMENTS 4,361,187 A 11/1982 Luers
5,934,681 A 8/1999 Novak et al.
(Continued)

FOREIGN PATENT DOCUMENTS

CN 103458749 A 12/2013
CN 204426540 U 7/2015
(Continued)

OTHER PUBLICATIONS

Extended European Search Report issued in connection with corresponding EP Application No. 17210903.5 dated Jun. 18, 2018.
(Continued)

*Primary Examiner* — Michael Collins
(74) *Attorney, Agent, or Firm* — Maschoff Brennan

(57) ABSTRACT

The invention provides a mixing apparatus. The mixing apparatus includes a first container, wherein the first container comprises: a first port; and a mixing chamber. The mixing apparatus further includes a second container, wherein the second container is adapted to receive the first container, and a seal disposed between the first container and the second container. In addition, the mixing apparatus includes a channel between the first port and the mixing chamber, wherein the channel is defined by the seal and the first container. In some examples, the seal includes: a first seal portion; and a transition seal portion, the transition portion comprising: a seal split; and an air intake channel.

20 Claims, 8 Drawing Sheets

(56) References Cited

U.S. PATENT DOCUMENTS

| | | | |
|---|---|---|---|
| 8,635,945 B2 | 1/2014 | Verbeek | |
| 9,060,647 B2 * | 6/2015 | Rellis | A47J 31/4489 |
| 10,064,516 B2 * | 9/2018 | Holten | B01F 23/235 |
| 10,772,459 B2 | 9/2020 | Diamanti et al. | |
| 11,882,958 B2 * | 1/2024 | Roumen | B01F 35/561 |
| 2003/0137897 A1 | 7/2003 | Whiteley | |
| 2007/0158366 A1 † | 7/2007 | Van Deer Meer | |
| 2012/0085241 A1 † | 4/2012 | Krug | |
| 2014/0044847 A1 | 2/2014 | Hellmaier | |
| 2014/0123858 A1 * | 5/2014 | Rellis | A47J 31/4403 99/293 |
| 2016/0113436 A1 | 4/2016 | Noordhuis et al. | |
| 2017/0127876 A1 | 5/2017 | Van Eeden et al. | |

FOREIGN PATENT DOCUMENTS

| | | |
|---|---|---|
| CN | 205072680 U | 3/2016 |
| CN | 105906859 A | 8/2016 |
| CN | 205612269 U | 10/2016 |
| CN | 206062918 U | 4/2017 |
| CN | 206213781 U | 6/2017 |
| EP | 1688075 A1 | 8/2006 |
| EP | 1699328 A1 | 9/2006 |
| EP | 2112898 A1 | 11/2009 |
| EP | 3020312 A1 † | 5/2016 |
| GB | 2267882 A | 12/1993 |
| KR | 10-2016-0044075 A † | 4/2016 |
| WO | 2011064702 A1 | 6/2011 |
| WO | 2014162262 A1 | 10/2014 |
| WO | 2017103709 A1 | 6/2017 |

OTHER PUBLICATIONS

International Search Report and Written Opinion issued in connection with corresponding PCT Application No. PCT/EP2018/086041 dated Feb. 20, 2019.

* cited by examiner
† cited by third party

MIXING APPARATUS HAVING A SEAL

CROSS-REFERENCE TO RELATED APPLICATIONS

The present application is continuation application of U.S. application Ser. No. 16/958,728 filed on Jun. 28, 2020, which is a U.S. National Phase application under 35 U.S.C. § 371 of International Application No. PCT/EP2018/086041, filed on Dec. 20, 2018, which claims the benefit of European Patent Application No. 17210903.5, filed on Dec. 28, 2017. These applications are hereby incorporated by reference herein.

FIELD OF THE INVENTION

This invention relates to the field of automatic beverage preparation, and more specifically to the field of automatic frothed milk beverage preparation.

BACKGROUND OF THE INVENTION

Typically, full automatic espresso appliances provide the function of automated cappuccino brewing. In most cases, steam is used for heating and/or frothing the milk, in a similar manner to a barista. To improve the ease of use of the appliance and provide stable performance to all users regardless of skill, several milk frothing modules have been developed. Normally, these modules are removable from the base appliance, so that all parts in contact with milk can be cleaned. Known solutions in the field are complex by design and (dis-)assembly can be difficult.

To be able to open and expose the milk contacting channel for cleaning, the channel may be split. The split channel must be properly sealed in assembled condition to prevent any leakage of the milk to the rest of the appliance.

With current seal solutions the seal indentation is strongly related to the sealing force and may be insufficient in channel portions where the pressure is high, e.g. in a steam transporting channel portion.

There is therefore a need for a milk frothing channel solution that is simple to disassemble and clean, whilst providing adequate sealing across different portions of the milk frothing channel that are subjected to various conditions during the milk frothing process.

SUMMARY OF THE INVENTION

The invention is defined by the claims.

According to examples in accordance with an aspect of the invention, there is provided a mixing apparatus comprising:
  a first container, wherein the first container comprises:
    a first port; and
    a mixing chamber for mixing milk with steam and optionally air;
  a second container, wherein the second container is adapted to receive the first container;
  a seal disposed between the first container and the second container; and
  a channel between the first port and the mixing chamber, wherein the channel is defined by the seal and the first or second container.

This arrangement allows for milk and steam to be provided to the mixing chamber by way of a channel defined at least in part by a seal. In this way, the channel may be disassembled for cleaning by simply removing the first container from the second container.

In addition, as the channel is itself defined in part by the seal when disposed between the first and second containers, the adequate sealing of the channel is ensured. Mounting of the two containers together provides the required seal positioning and/or compression or extension.

In an embodiment, the first container comprises a raised container portion, and wherein the channel is further defined by the raised container portion.

In this way, the dimensions of the channel may be controlled by altering the depth of the raised container portion. The seal, or at least the surface thereof that helps defining the channel, can in such case be smooth making cleaning thereof very easy.

In a further embodiment, the raised container portion causes an indentation in the seal of greater than 0.2 mm, for example 0.6 mm.

In order to create a sealing force between the seal and the first container, an indentation is required. By providing an indentation of, for example, 0.6 mm, the area between the first and second containers is reduced, whilst not requiring an excessively high sealing force that may cause deformation of the parts and/or impede proper assembly of the first and second containers by a user.

In an arrangement, the seal comprises a raised seal portion, and wherein the channel is further defined by the raised seal portion.

In this way, the dimensions of the channel may be controlled by altering the depth of the raised seal portion. Cleaning required for the first container may be reduced as the first container may be free of raised container portions.

In some embodiments, the second container comprises:
  a second port; and
  a third port, wherein the third port is connected to the mixing chamber, and wherein the channel further connects the second port to the first port and the mixing chamber.

In this way, it is possible for milk, steam or any other ingredient to enter the channel from outside of the second container. In addition, the third port allows the contents of the mixing chamber to leave the mixing apparatus without requiring additional extraction from the first container.

In an embodiment, the seal comprises:
  a first sealing portion;
  a second sealing portion comprising a first seal port; and
  a third sealing portion.

The three portions provide sealing of different channel portions and they may be designed independently although together they may form a single integral seal element.

In a further embodiment, at least one of the: seal thickness; seal width and shore hardness of the first, second or third sealing portions may be determined independently of the other sealing portions.

In this way, it is possible to tune various portions of the seal according to the conditions those portions are exposed to. For example, a sealing portion that is exposed to high pressure may have a larger seal thickness than a sealing portion exposed to normal pressures. As a further example, for a sealing portion when the channel dimensions are particularly important, the seal hardness may be higher than for a sealing portion where the channel dimensions are less critical.

In an arrangement, the seal comprises a span seal. A span seal is a seal which is extended across and beyond an opening and thus acts down over the opening in the manner of a closing lid. Thus it spans the full area of the opening to be sealed rather than forming a seal around a separate closure part. The term "span seal" is used to denote this general type of sealing configuration.

The span seal operates using pull forces, which stretch the seal rather than compress it. This results in a slow rising indentation force, which means manufacturing tolerances in the various parts are easier to overcome without adding a lot of useless force. The span seal provides sealing direct to the channel without a large amount of deformation making the geometry of the channels easier to control.

In some arrangements, the span width of the sealing portions may be determined independently of the other sealing portions.

By controlling the span width of the span seal, it is possible to further control the sealing force and indentation of the seal.

In an embodiment, the channel comprises:
a first channel portion, wherein the first channel portion is defined by the first sealing portion and the first container and is connected to the first port;
a second channel portion connected to the first channel portion, wherein the second channel portion is defined by the second sealing portion and the first container; and
a third channel portion connected to the first and second channel portions and the mixing chamber, wherein the third channel portion is defined by the third sealing portion and the first container.

In a further embodiment, the second channel portion is adapted to receive steam by way of the first seal port.

In this way, steam may be provided to the channel from outside of the second container without compromising the sealing of the seal.

In further or other embodiments, the first channel portion is adapted to receive milk by way of the first port.

In this way, milk may be stored in the first container and provided from the first container to the channel without compromising the sealing.

In yet further or other embodiments, the third channel portion is adapted to receive input from the first and second channel portion and wherein the third channel is adapted to impart a Venturi effect on the received input.

In this way, the contents of the mixing chamber are prevented from flowing back into the channel due to the pressure difference caused by the third channel portion.

In an arrangement, the shore hardness of the seal is in the range 30 to 60, for example 40 to 45 (based on the shore hardness scale A).

In this way, the deformation of the seal over a range of pressures will be reduced.

According to examples in accordance with an aspect of the invention, there is provided a mixing apparatus comprising:
a first container comprising a mixing chamber for mixing milk with steam and/or air;
a second container, adapted to receive the first container and comprising a third port that in assembled condition is connected to the mixing chamber;
a seal disposed between the first container and the second container, wherein the seal comprises:
a first sealing member disposed between the mixing chamber and the third port; and
a transition seal portion, the transition seal portion comprising:
a seal split; and
an air intake channel; and
a channel connected to the mixing chamber and the seal split, wherein the channel is defined by the first or second container and the transition seal portion.

This arrangement provides a first sealing member between the mixing chamber of the first container and the third port of the second container, whilst also providing a transition seal portion thereby allowing milk, steam or other such ingredients to enter the mixing chamber without compromising the sealing of the apparatus.

Typically, a simple seal split would present a vulnerability in the sealing of the apparatus as the seal does not fully surround the mixing chamber; however, the air intake allows air to be drawn through the seal split and into the mixing chamber. In this way, ingredients entering the mixing chamber are prevented from leaking through the seal split of the transition portion of the seal.

In an embodiment, the air intake channel defines an air flow from the air surrounding the mixing apparatus to the mixing chamber.

In this way, the air intake may draw air in from the surrounding environment using the negative pressure caused by the ingredients flowing from the channel to the mixing chamber.

In a further embodiment, the air intake imparts a Venturi effect on the air flow.

In this way, the ingredients are prevented from leaving the channel through the air intake due to the pressure difference between the channel and the air intake.

In an arrangement, the first sealing member comprises a radial seal.

In this way, it is possible to seal the outer edges of the mixing chamber without interrupting the flow of the contents of the mixing chamber to the third port of the second container.

The seal may further comprise a first sealing portion which defines a milk introduction passageway.

There may also be a second sealing portion which comprises a first seal port for the introduction of steam.

The transition seal portion may be disposed between the first sealing member and the second sealing portion.

The first container may further comprise a first port and wherein the channel, in particular the milk introduction passageway thereof further connects the first port to the mixing chamber. The channel may be defined by the transition seal portion, the first and second sealing portions and the first container.

The first and second sealing portions preferably comprise span seals whereas the first sealing member is a radial seal.

In this way, it is possible to seal both the mixing chamber and the channel system described above using a single integrated seal. This further reduces the complexity of disassembling the apparatus for cleaning as only one seal requires cleaning for both the channel and the mixing chamber.

At least one of the: span seal thickness, shore hardness and span width of the first and second sealing portions may be different to each other.

In this way, it is possible to tune the first and second sealing portions according to the conditions those portions are exposed to, as described earlier.

The transition seal portion may further allow a transition between two seal types, thereby enabling the most appropriate seal type to be used depending on the area being sealed. For example, the transition portion may allow for a span seal over the channel and a radial seal around the mixing chamber to be integrated into the same seal.

According to examples in accordance with an aspect of the invention, there is provided a coffee maker, the coffee maker comprising;
a liquid coffee extraction apparatus; and
the mixing apparatus as described above.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a mixing apparatus. The mixing apparatus includes a first container, wherein the first container comprises: a first port; and a mixing chamber. The mixing apparatus further includes a second container, wherein the second container is adapted to receive the first container, and a seal disposed between the first container and the second container. In addition, the mixing apparatus includes a channel between the first port and the mixing chamber. The channel is defined by the seal and the first or second container.

In some examples, the seal includes: a first seal portion; and a transition seal portion, the transition portion comprising: a seal split; and an air intake channel.

Figure 1A:
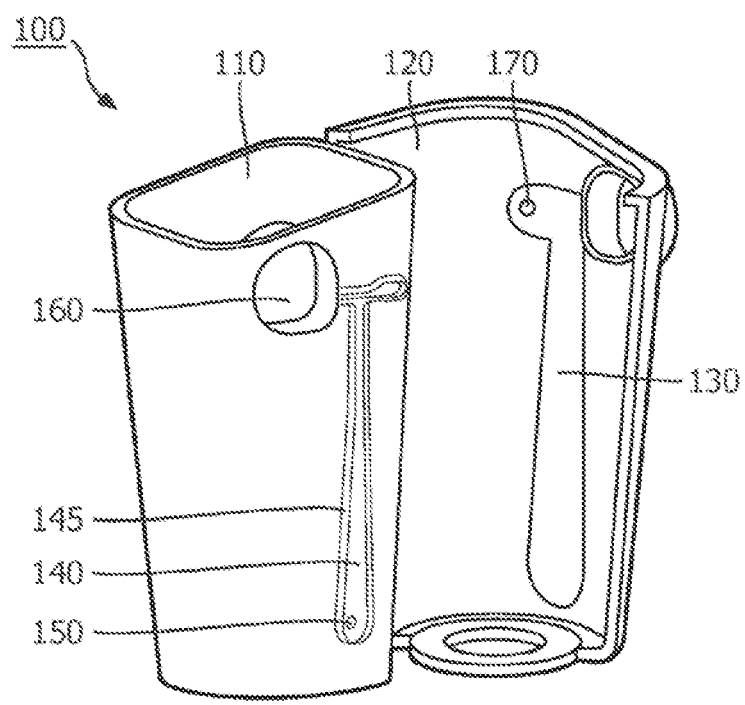
FIG. 1A shows an exploded view of an example mixing apparatus.

FIG. 1A shows a mixing apparatus 100 comprising: a first container 110; a second container 120, adapted to receive the first container; and a seal 130 disposed between the first and second containers.

The seal is for example a press fit into a side wall of one of the two containers so that when the two containers are assembled, the seal is sandwiched between them. The mating between the seal and one of the containers forms a closed channel which defines fluid paths for a milk inlet, a steam inlet and optionally an air inlet. By separating the two containers all parts can be easily cleaned. There is only one seal element for defining all the channels used for the supply and mixing of milk with steam and/or air.

The seal may be 2 shot (2K) molded into the first or second container, or else it may be a separate seal which is removable from a recess in the first or second container.

The mixing apparatus further comprises a channel 140, which is defined by the seal 130 and the first container 110 when the mixing apparatus is assembled. In the example shown in FIG. 1, the first container 110 comprises a raised channel portion 145, which further defines the channel. The channel connects a first port 150 at the bottom of the channel and a mixing chamber 160 at the top of the channel. In addition, the second container 120 comprises a second port (not visible in FIG. 1A) connected to a first seal port 170 of the seal, wherein the channel further connects the first seal port 170 to the first port and the mixing chamber.

Figure 1B:
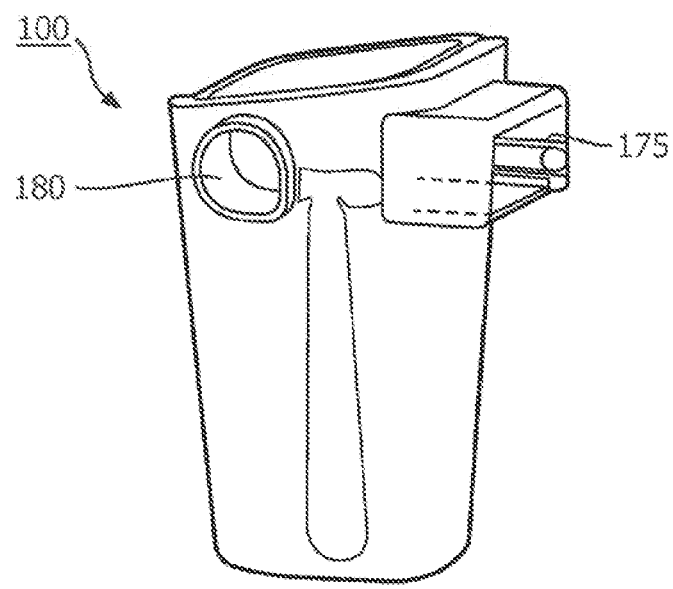
FIG. 1B shows an assembled view of the mixing apparatus of FIG. 1A.

FIG. 1B shows the mixing apparatus 100 of FIG. 1A in an assembled state.

In this Figure, it can be clearly seen that the second container 120 further comprises a second port 175 from which steam is provided to the first seal port 170, and a third port 180 connected to the mixing chamber 160 of the first container 110, thereby allowing the contents of the mixing chamber to be easily obtained from the mixing apparatus 100. The operation of the mixing apparatus is described with reference to FIG. 2A below.

Figure 2A:
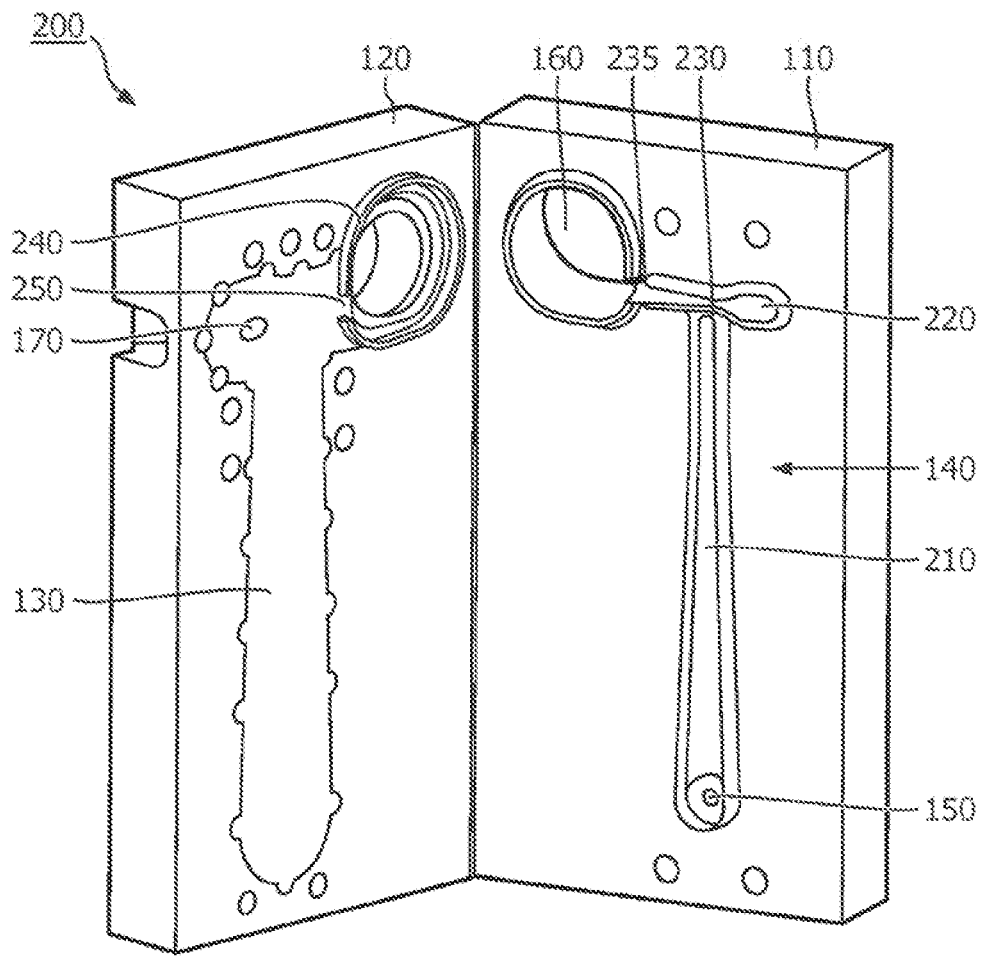
FIG. 2A shows a detailed view of the channel of the mixing apparatus of FIG. 1A.

FIG. 2A shows a detailed view 200 of the channel 140 of the mixing apparatus of FIG. 1A.

The channel 140 may be divided into several portions according to the operation performed by each portion. In operation, milk may be provided to the first container 110 and steam may be provided to the first seal port 170. As steam enters the channel 140, milk is drawn from the first container 110 into a first channel portion 210 by way of the first port 150. The steam enters a second channel portion 220 and travels through a third channel portion 230 and into the mixing chamber 160, the flow of steam generating a negative pressure in the first channel portion 210, thereby drawing the milk along the first channel portion.

The milk is drawn along the first channel portion 210 until it meets the intersection of the three channel portions, where the flow of steam draws the milk and steam into the third channel portion 230 which terminates at an end 235 which opens into the mixing chamber 160. The third channel portion may be adapted to impart a Venturi effect on the milk and steam as they pass through the third channel portion.

The steam is used to heat the milk and it operates the Venturi (i.e. a reduced pressure) to suck the milk up the first channel portion 210.

Air may be introduced at the end point 235, by suction due to the flow speed. For this reason, the arrangement doesn't leak. The air introduced provides bubbles for the desired frothing.

The Venturi effect may be achieved by simply restricting the cross sectional area of the third channel portion 230 relative to the first 210 and second 220 channel portions. The increase in speed of the milk and steam as they enter the third channel portion in combination with the drawing in of air defines the frothing performance of the mixing apparatus, and the pressure differential prevents the milk and steam from flowing down the incorrect channels.

The first channel portion 210 is typically vertical in use and extends up from the (milk entry) first port 150. At the top it meets the second channel portion 220 to one side which has a steam entry port 170 at its remote end, and it meets the third channel portion 230 to the other side, which has the mixing chamber 160 at its remote end. The channel 140 may thus have a T-shape, and the seal 130 may have a corresponding T-shape.

The seal 130 is for example an integral part of the second container 120. It may alternatively be a removable seal, in which case it may be a press fit into a side wall of the second container 120. In some instances, the seal 130 comprises a first sealing member 240 comprising transition portion 250. These will be described in more detail with reference to FIGS. 7 and 8.

Figure 2B:
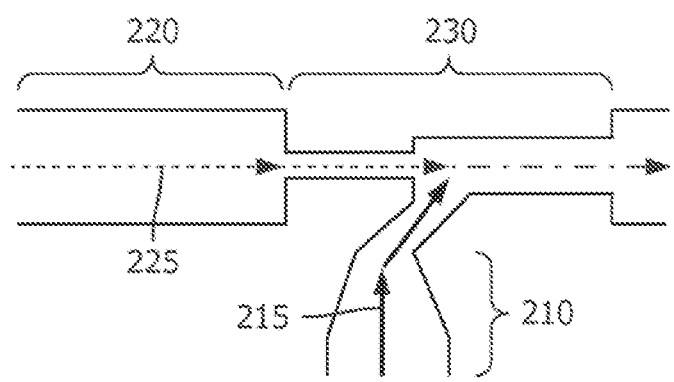
FIG. 2B shows the flow of fluid through the channel of FIG. 2A.

FIG. 2B shows a simple illustration of the intersection of the three channel portions.

As described above, the milk 215 flows along the first channel portion 210 due to the negative pressure generated by the steam 225 flowing from the second channel portion 220 to the third channel portion 230. As can be seen from the Figure, the channel widths are reduced as the milk and steam enter the third channel portion, thereby imparting a Venturi effect on the milk and steam flows, which is used to draw the milk along its channel.

Air may be drawn in at the end 235 of the third channel portion 230 so that there is a milk, steam and air mixture entering the mixing chamber 160. The aim of the mixing chamber is to release large bubbles and retain only small air bubbles in the mixture. The air, milk and steam mixture forms the fluid that enters the mixing chamber.

Figure 3A:
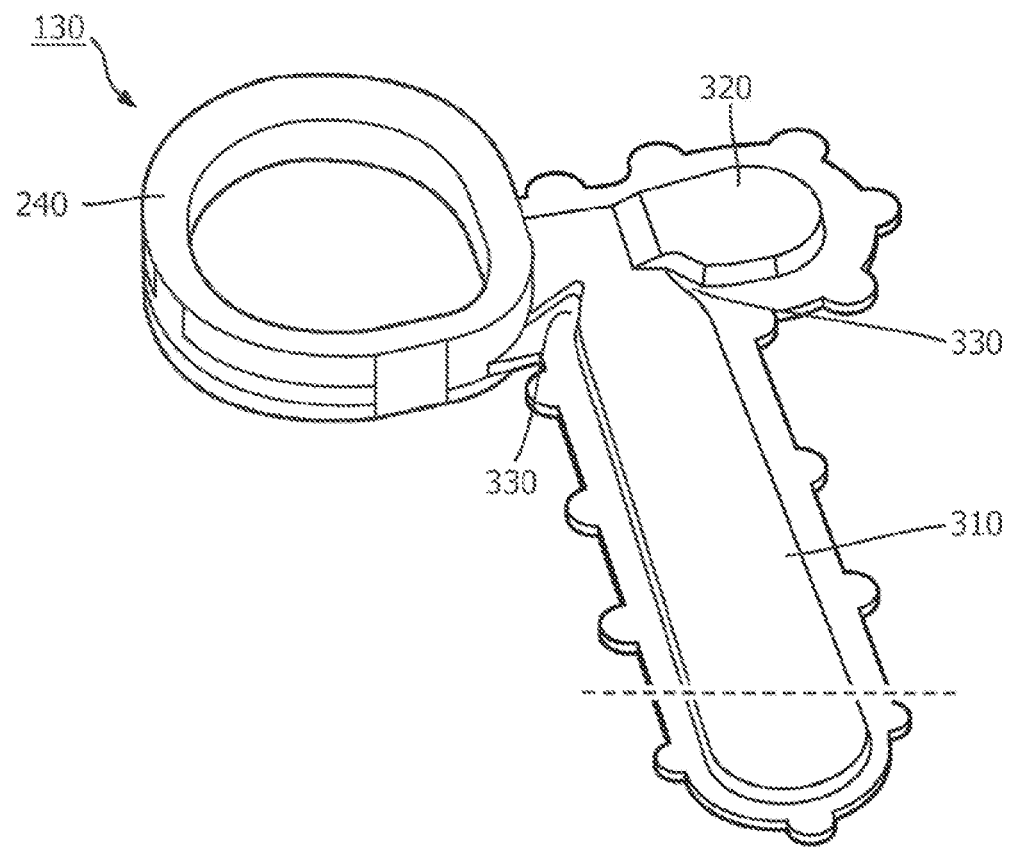
FIG. 3A shows an example seal.

FIG. 3A shows the seal 130 of FIG. 2A in more detail.

It is clear from the above passage relating to FIG. 2A that the various channel portions undergo a variety of different conditions when the mixing apparatus 100 is in operation. Thus, as each seal area has their own specification, the seal, in this case a span seal, can be optimised for each area without risk of leakage in the transition areas.

There are three parameters that may be adjusted to tune the sealing force of the span seal. The three parameters are: the shore hardness of the seal; the span width of the seal, which increases the sealing force but may also introduce some deformation to the channel; and the thickness of the seal. As the various areas of the span seal may be tuned using the span width and seal thickness, the risk of leakage is largely reduced as the need for transitions between different seals is eliminated.

For example, the seal may comprise a first sealing portion 310 for sealing the first channel portion 210 of the channel. Thus, the first sealing portion 310 should be adapted to withstand the negative pressure present in the first channel portion 210. As this pressure is typically low, for example, around −0.15 bar, the required sealing force is low; however, the first channel portion 210 may be relatively long, for example 200 mm, meaning that the required sealing force increases. As the milk is low temperature at this stage and the dimensions of the first channel portion 210 are not critical to the milk frothing process, the sealing force of the first sealing portion 310 may be increased by simply increasing the span width.

As a further example, the seal 130 may comprise a second sealing portion 320 for sealing the second channel portion 220 of the channel 140. In this case, the second sealing portion 320 must withstand both the high pressure, for example 1 bar, and the high temperature, for example 105°, of the steam entering the channel. As with the first channel portion 210, the geometry of the second channel portion 220 is not critical to the milk frothing process meaning that the span width of the second sealing portion 320 may be increased to increase the sealing force and the seal thickness may be increased to increase both the sealing force of the second sealing portion and the resistance of the second sealing portion to the high temperature of the steam.

As a final example, the seal 130 may comprise a third sealing portion 330 for sealing the third channel portion 230 of the channel. The dimensions of the third channel portion 230 are critical to the performance of the milk frothing process and the tolerance for deformation is low, for example ±0.1 mm. Therefore, the span width of the third sealing portion 330 may not be freely increased and seal thickness delivers only marginal benefit to the sealing force itself. In this case, the shore hardness of the seal provides the required sealing force. The shore hardness of the seal may be constant, for example 45 shore, throughout the seal in order to prevent excessive span widths and seal thicknesses in the first and second sealing portions 310, resp. 320. In addition to the milk frothing process, the seal 130 would be required to withstand daily cleaning, typically by way of a dishwasher. In this case, the shore hardness of the seal may help to extend the lifetime of the seal.

Finally, the illustrated seal 130 has the first sealing member 240 which provides a radial seal around the mixing chamber 160. The three sealing portions 310, 320, 330 are span seals whereas the first sealing member 240 is a radial seal. A span seal cannot be used to seal the mixing chamber 160 because an opening is needed from the mixing chamber 160 to the third port 180. The three sealing portions 310, 320, 330 and the first sealing member 240 may together form a single integrated component.

Figure 3B:
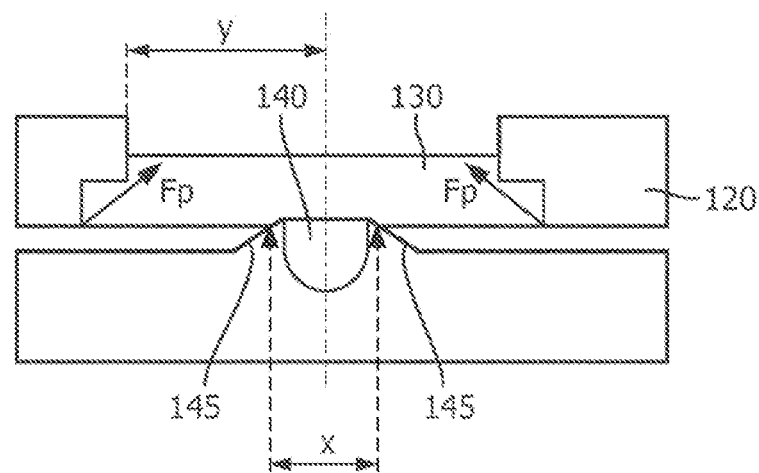
FIG. 3B illustrates the operation of the span seal of FIG. 3A.

FIG. 3B illustrates the operation of a span seal acting as the seal 130.

The span seal works on pull forces, $F_p$, which stretch the seal over the channel 140 instead of compressing it. The span seal provides sealing directly onto the channel without a large amount of deformation. The channel 140 cross section dimension and shape is independent of the indentation and sealing force leading to a more stable milk froth performance, particularly in the third sealing portion 330. The indentation of the span seal may be, for example, 0.6 mm. The span width, S, of a span seal is defined as:

$$S = Y - x/2$$

where y is the distance from the centre of the channel 140 to the edge of the span seal 130 and x is the width of the channel.

Figure 4A:
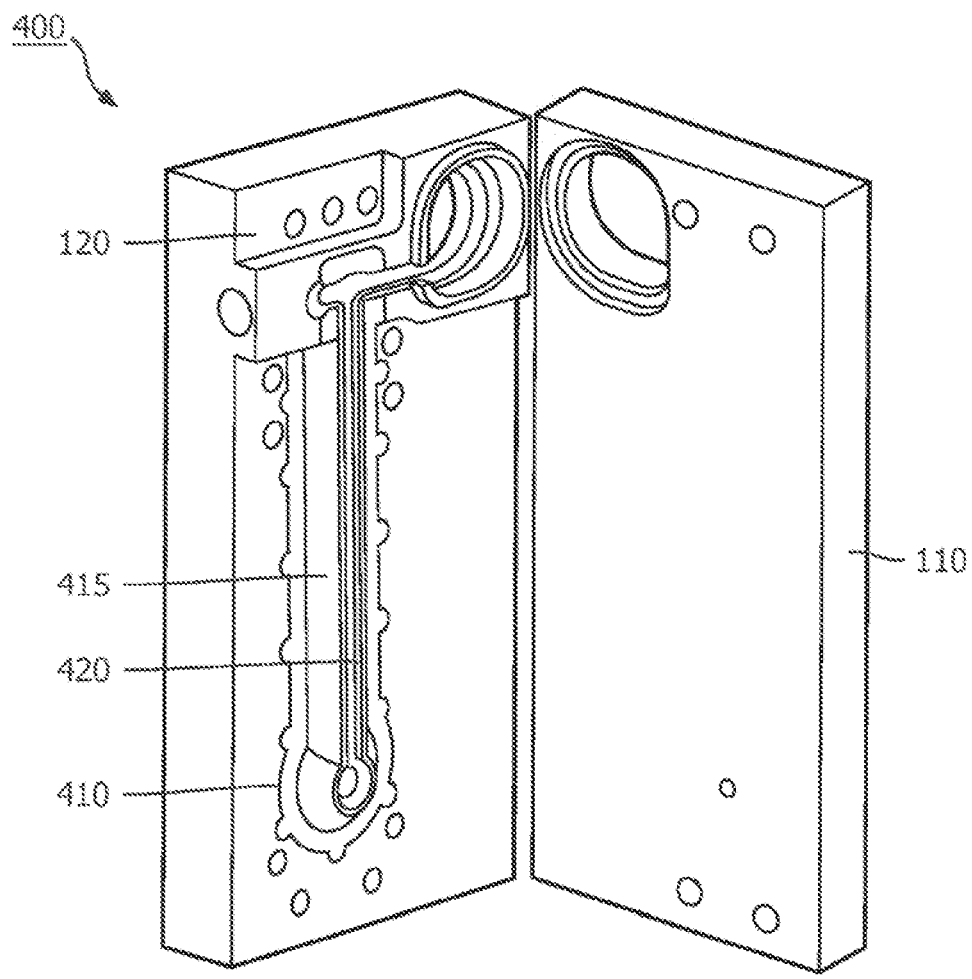
FIG. 4A shows an alternative channel of a mixing apparatus.
Figure 4B:
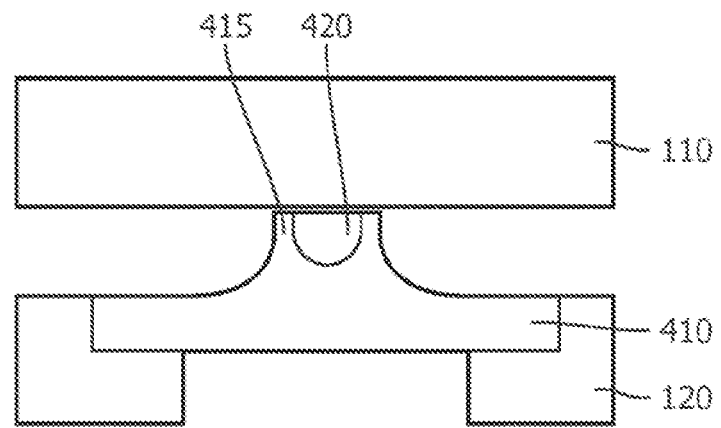
FIG. 4B shows a cross section of the channel of FIG. 3A.

FIGS. 4A and 4B show a detailed view of an alternative channel arrangement 400.

In this case, the seal 410 comprises a raised seal portion 415, which define the channel 420 in combination with the first container 110. This arrangement may simplify the cleaning of the first container 110 as there are fewer raised portions in which the ingredients may get stuck. In this case, the shore hardness of the seal would need to be further increased in order to ensure that the raised seal portion 415 does not deform under high pressure, thereby causing leakage to occur.

Figure 5:
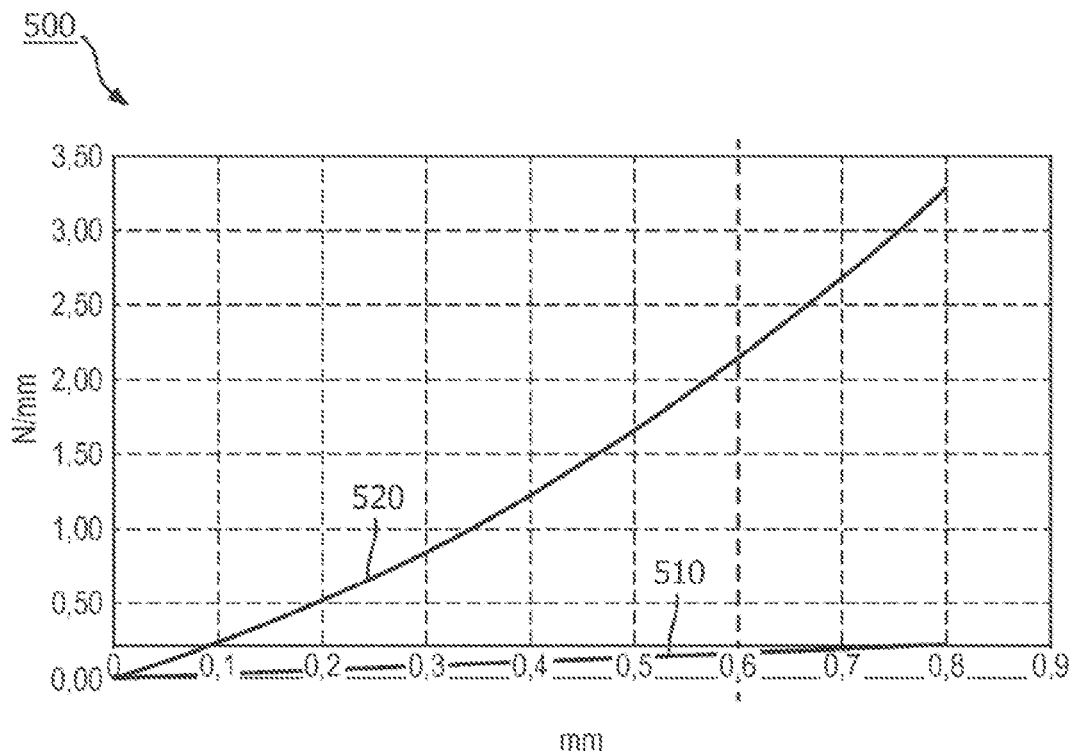
FIG. 5 shows a graph of indentation against seal pressure for a span seal and a compression seal.

FIG. 5 shows a graph 500 of required seal pressure, N/mm, against indentation, mm, for a span seal (plot 510) and a compression seal (plot 520). The seal pressure was measured for a seal length of 250 mm at a shore hardness of 60 shore, with a nominal indentation of 0.6 mm as shown by the dotted line.

As can be seen from the graph, the required seal pressure for the compression seal 520 rises far quicker than for the span seal 510 in order to reach the same indentation. From the graph, the required seal pressure for an indentation of 0.6 mm on the compression seal is 2.1 N/mm. This leads to a total seal force of 2.1 N*250 mm=575 N. A seal force of 575 N may cause considerable deformation of the components of the mixing apparatus and a situation in which a user may not be able to properly assemble the mixing apparatus. In this case, lowering the shore hardness of the seal would not decrease the sealing force enough.

Looking to the span seal of plot 510, an indentation of 0.6 mm requires 0.2 N/mm seal pressure. This leads to a sealing force of 0.2 N*250 mm=50 N. Whilst a sealing force of 50 N is still high, by lowering the shore hardness it may be brought into an acceptable range.

Figure 6:
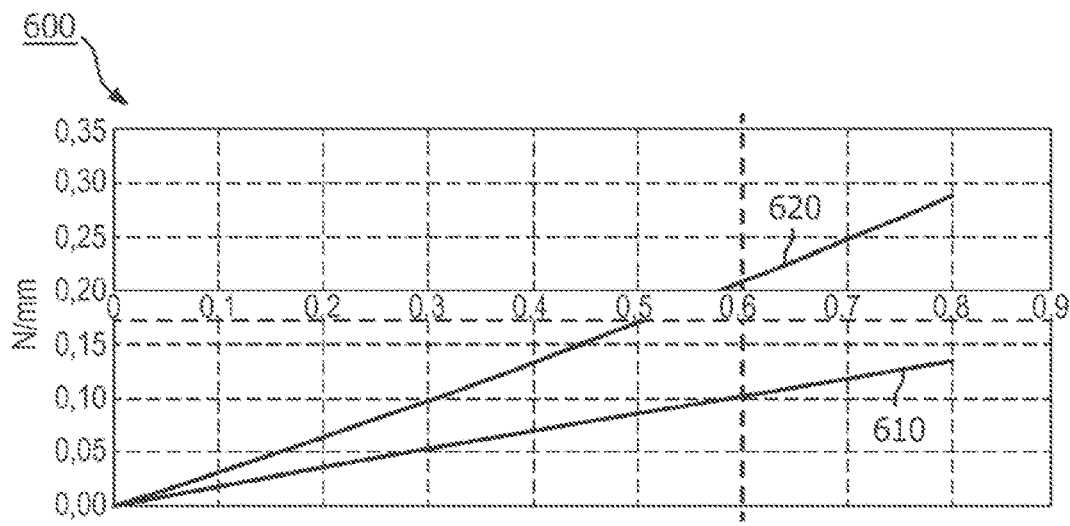
FIG. 6 shows a graph of indentation against seal pressure for different portions of the seal.

FIG. 6 shows a graph of seal pressure, N/mm, against indentation, mm, for the first sealing portion (plot 610) and second sealing portion (plot 620) of a span seal, of shore hardness 45 shore, acting as the seal 130.

In this case, the span width of the first and third sealing portions is 3.1 mm and the seal thickness is 2 mm; whereas the span width of the second sealing portion is 2.1 mm and the seal thickness is 3 mm. As can be seen from the graph, for an indentation of 0.6 mm across the entire seal, the seal pressure is well below 0.25 N/mm, which is within acceptable levels of sealing force for use in the mixing apparatus.

Figure 7:
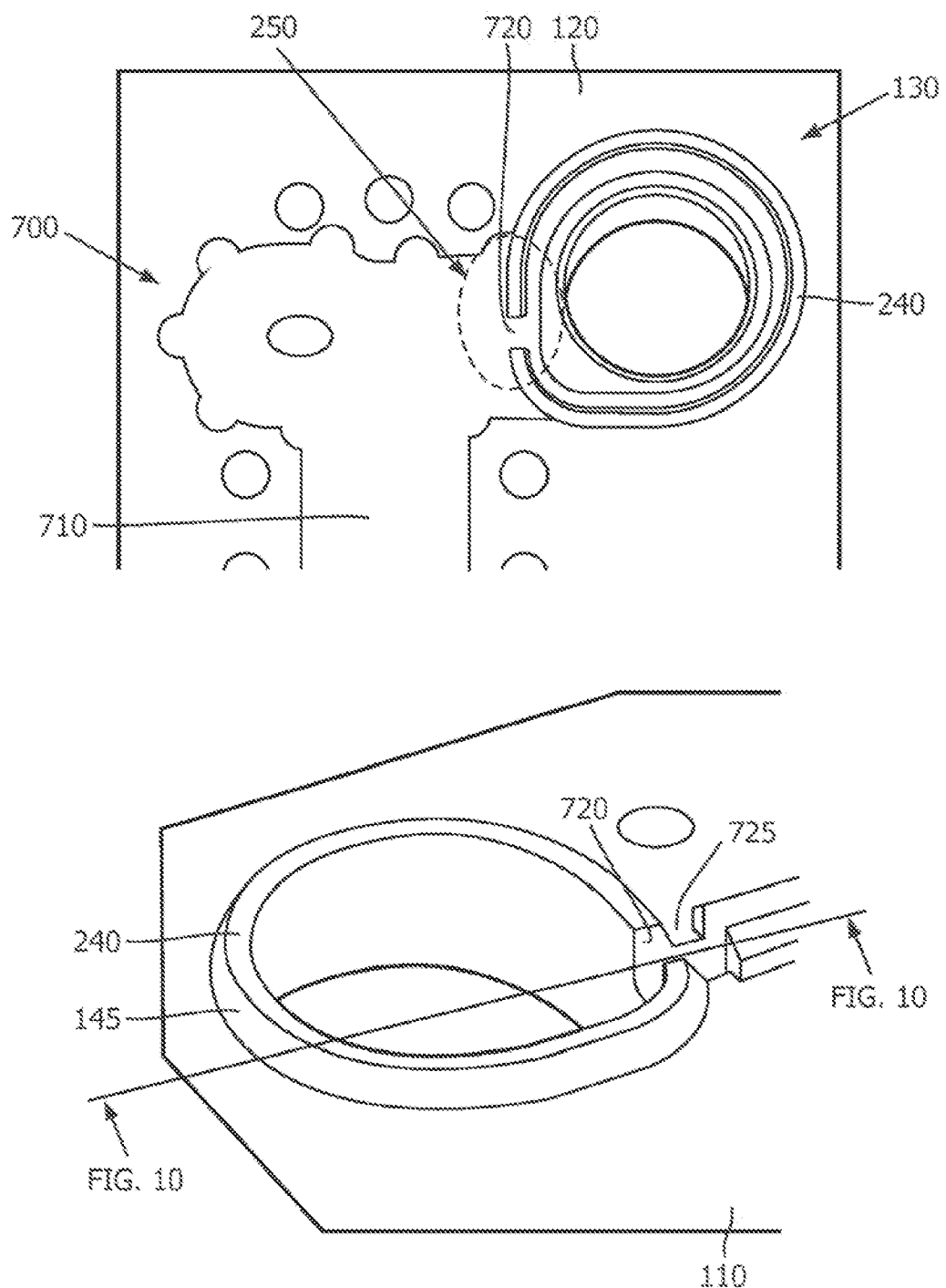
FIG. 7 shows an example transition portion of a seal.

FIG. 7 shows a seal 700 having a first sealing member 240, which in this case is a radial seal, and a transition portion 250 as previously illustrated in FIG. 2A. A view from above is shown in the top image and a perspective view of the opposite container 110 is shown in the bottom image.

The transition portion 250 comprises a seal split 720 to facilitate the movement of milk and steam from the channel defined by the other sealing portions 710 (equivalent to 310, 320 and 330 in FIG. 3A), which in this case is the set of span seals as described above, into the mixing chamber. In this way, it is possible to integrate both the span seals and the radial seal into a single seal, thereby increasing the simplicity of the mixing apparatus for disassembly and cleaning.

Performing a straight combination of a radial and span seal will typically cause leakage in the transition area due to the seal split.

As seen more clearly in the bottom image of FIG. 7 (and in FIG. 2A as well), the channel 140 in this example is defined by raised portions 145 of the first container 110. The raised portions define the sides of the flow channels where span seals are to be applied. At the seal split there is a gap 725 in the side wall which allows external communication to the end 235 of the third channel portion 230 (as shown in FIG. 2A). The gap 725 opens into the space between the first and second containers 110, 120.

Figure 8:
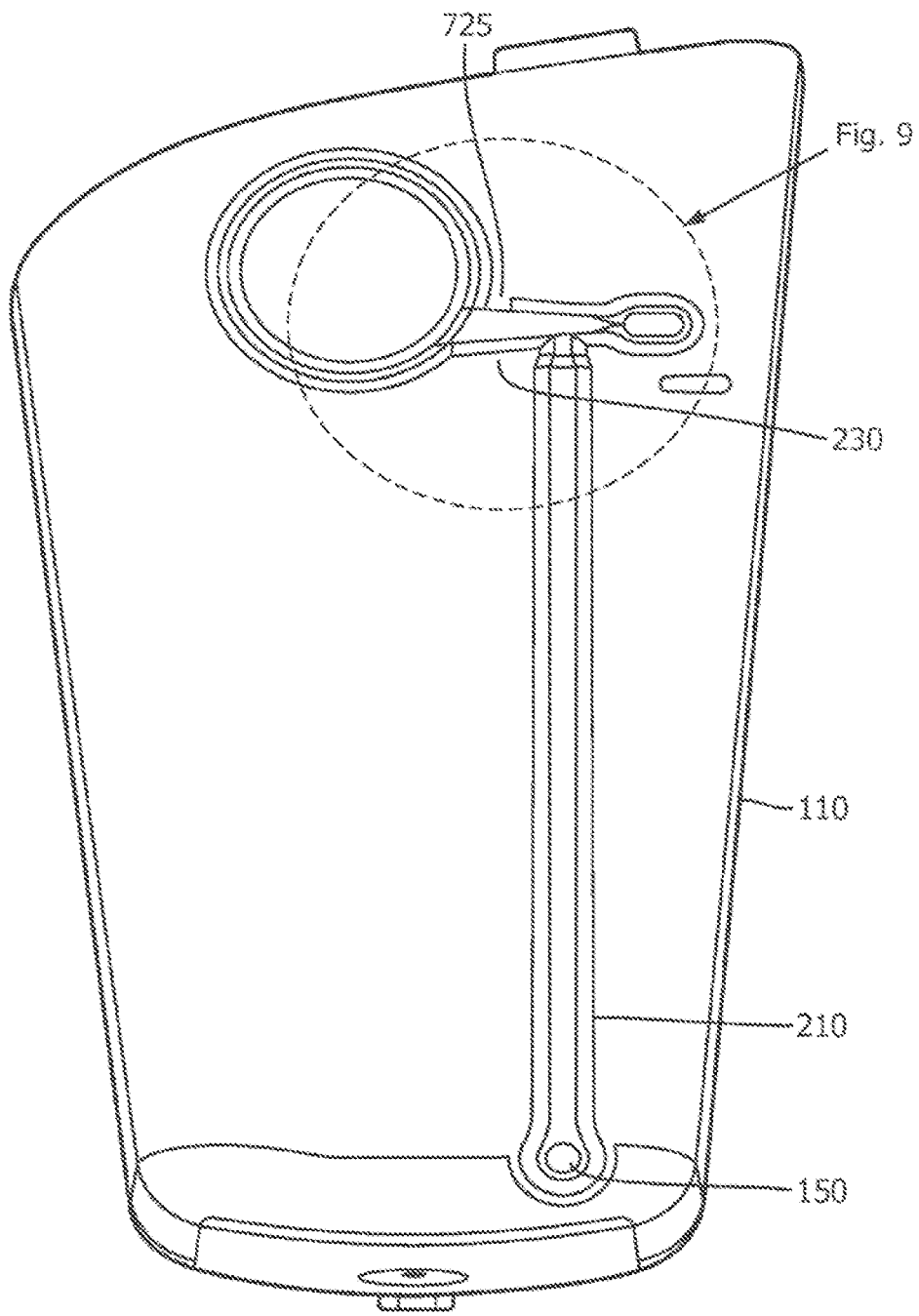
FIG. 8 shows the channel for the design of FIG. 2A in more detail.

FIG. 8 shows the channel (for the design of FIG. 2A) in more detail.

The seal is again fitted to the second container 120 and the raised ridges are formed on the first container 110 as shown in FIG. 8.

The gap 725 for allowing the intake of air in this example is provided only on one side of the third channel portion 230. Only the top side (i.e. the side facing away from the first port 150) is open. The gap 725 comprises an omitted section of the raised portions which defines the third channel portion 230. The omitted section may for instance have a length in the range of 1.5 to 5 mm.

Figure 9:
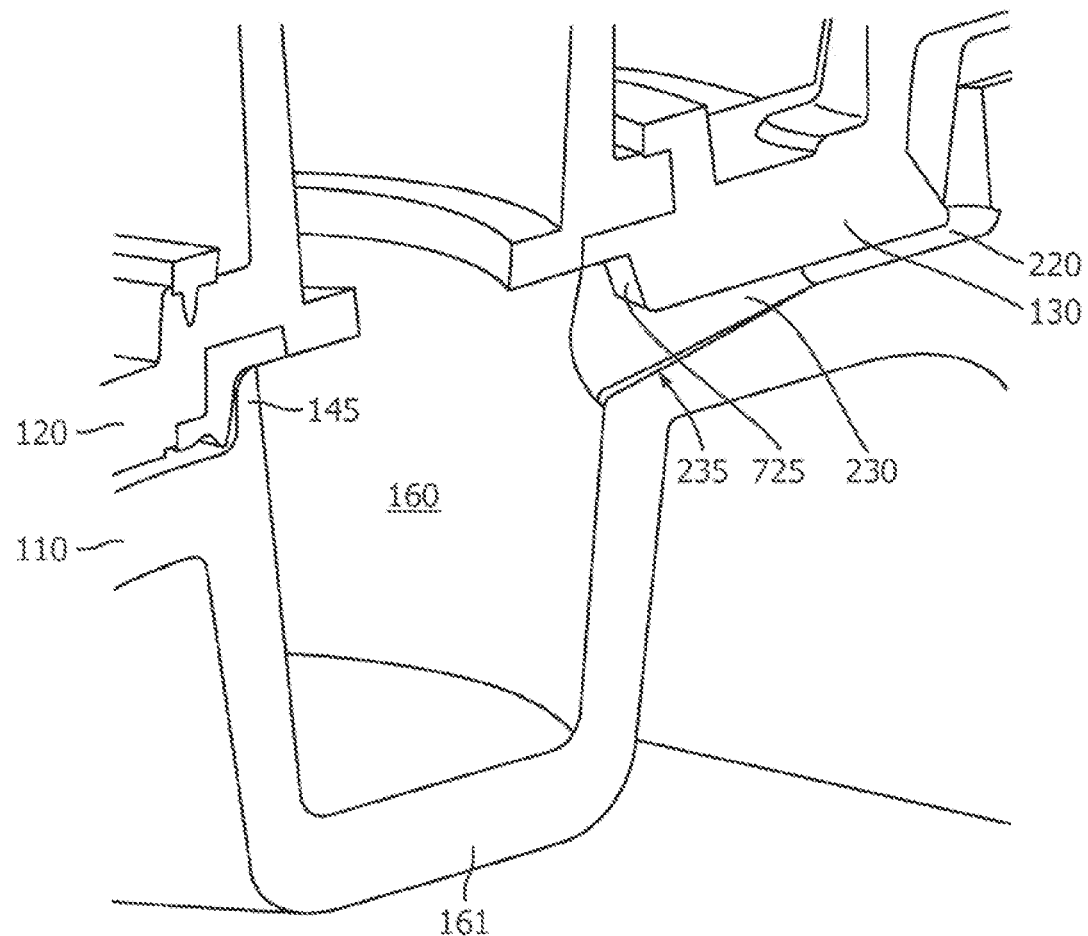
FIG. 9 shows a perspective view in cross section of the top end of the channel.

FIG. 9 shows a perspective view in cross section (the cross section is identified in FIG. 7). FIG. 9 shows the closed base 161 for the inner part of the mixing chamber 160. It shows the second and third channel portions 220, resp. 230 and the gap 725 in the raised portion at the end 235 of the third channel portion 230, which functions as the air inlet. It shows the seal 130 as an integral part of the second container 120.

An air inlet is formed by the gap 725. This defined transition portion 250 can be achieved through a controlled combination of the seal 720 split and Venturi of the milk froth system. In this area no sealing is allowed, as ambient air must be sucked in. By providing the air inlet in line with the channel system at the transition portion 250 of the seal 130, the sealing area is controlled as the air drawn in by the flow within the channel prevents uncontrolled leakage of milk.

The speed of the liquid (milk, steam and air) entering the mixing chamber 160 is important for the foam quality. It is preferred that the air enters at the end 235 of the third channel portion 230. There is a minimum hole size such as formed by a 1.5 mm gap. The distance between the milk Venturi and the air gap, and the distance between the air gap and the mixing chamber 160 are the key parameters for defining the milk frothing characteristics.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A mixing apparatus, comprising:
   a first container that comprises a first port configured to draw milk from the first container towards a mixing chamber;
   a second container configured to be assembled with the first container;
   a seal disposed between the first container and the second container; and
   a channel extending from the first port towards the mixing chamber,
      wherein at least part of the channel is formed by the seal, wherein the milk is drawn through the channel to mix with steam and/or air in the mixing chamber.

2. The mixing apparatus of claim 1, wherein the seal is sandwiched between an assembly of the first container and the second container.

3. The mixing apparatus of claim 1, wherein the seal comprises:
   a first sealing portion;
   a second sealing portion comprising a first seal port; and
   a third sealing portion.

4. The mixing apparatus of claim 3, wherein the channel comprises:
   a first channel portion defined by the first sealing portion and the first container, and wherein the first channel portion is connected to the first port;
   a second channel portion connected to the first channel portion, wherein the second channel portion is defined by the second sealing portion and the first container; and
   a third channel portion connected to the first and second channel portions and the mixing chamber, wherein the third channel portion is defined by the third sealing portion and the first container.

5. The mixing apparatus of claim 4, wherein the first channel portion is adapted to receive milk by way of the first port.

6. The mixing apparatus of claim 5, wherein the raised container portion causes an indentation in the seal of greater than 0.5 mm.

7. The mixing apparatus of claim 3, wherein a span width of the first, second, and third sealing portions are different from each other.

8. The mixing apparatus of claim 4, wherein the second channel portion is adapted to receive steam by way of the first seal port.

9. The mixing apparatus of claim 4, wherein the third channel portion is adapted to receive input from the first and second channel portions, and wherein the third channel portion is adapted to impart a Venturi effect on the received input.

10. The mixing apparatus of claim 4, wherein the third channel portion terminates at an end which opens into the mixing chamber, and wherein the air is introduced at the end point.

11. The mixing apparatus of claim 4, wherein the first channel portion extends up from the first port, and wherein the first channel portion at top meets the second channel portion at one side and the third channel portion at another side.

12. The mixing apparatus of claim 1, wherein the channel has a T-shape and the seal has a corresponding T-shape.

13. The mixing apparatus of claim 1, wherein the second container is adapted to receive the first container, wherein the first container comprises a raised container portion, and wherein the channel is defined by the raised container portion.

14. The mixing apparatus of claim 1, wherein the seal comprises a raised seal portion, and wherein the channel is defined by the raised seal portion.

15. The mixing apparatus of claim 1, wherein the second container comprises:
a second port; and
a third port, wherein the third port in assembled condition is connected to the mixing chamber, and wherein the channel further connects the second port to the first port and the mixing chamber.

16. The mixing apparatus of claim 1, wherein the seal comprises a span seal.

17. The mixing apparatus of claim 1, wherein a shore hardness of the seal is in the range of 30 to 60 shore.

18. A coffee maker, the coffee maker comprising:
a liquid coffee extraction apparatus; and
the mixing apparatus of claim 1.

19. A mixing apparatus, comprising:
a container that comprises a port configured to draw milk from the container towards a mixing chamber, wherein the mixing chamber is configured to mix the drawn milk with steam and/or air;
a seal; and
a channel extending from the port towards the mixing chamber, wherein at least a part of the channel is formed by the seal and the container.

20. A mixing apparatus, comprising:
a container that comprises a port configured to draw milk from the container towards a mixing chamber, wherein the mixing chamber is configured to mix the drawn milk with steam and/or air;
a span seal; and
a channel extending from the port towards the mixing chamber, wherein at least a part of the channel is formed by the span seal spanning over a complete channel area.

* * * * *